US012704404B2

(12) United States Patent
Vernekar et al.

(10) Patent No.: US 12,704,404 B2
(45) Date of Patent: Aug. 11, 2026

(54) AMBIENT LIGHT SENSING SYSTEM AND METHOD FOR MEASURING AMBIENT LIGHT DURING PIXEL ON AND OFF PERIODS

(71) Applicant: ams-OSRAM Asia Pacific Pte. Ltd., Singapore (SG)

(72) Inventors: Sandeep Vernekar, Eindhoven (NL); BingBing Xu, Eindhoven (NL); Sudhakar Singamala, Eindhoven (NL); Dinesh Kuruganti, Eindhoven (NL); Helmut Theiler, Eindhoven (NL); David Harlow Sin, Eindhoven (NL); George Richard Kelly, Eindhoven (NL)

(73) Assignee: ams-OSRAM Asia Pacific Pte. Ltd., Singapore (SG)

( * ) Notice: Subject to any disclaimer, the term of this patent is extended or adjusted under 35 U.S.C. 154(b) by 76 days.

(21) Appl. No.: 18/708,225

(22) PCT Filed: Oct. 3, 2022

(86) PCT No.: PCT/SG2022/050709
§ 371 (c)(1),
(2) Date: May 8, 2024

(87) PCT Pub. No.: WO2023/086011
PCT Pub. Date: May 19, 2023

(65) Prior Publication Data

US 2024/0426653 A1 Dec. 26, 2024

(30) Foreign Application Priority Data

Nov. 11, 2021 (GB) .................................... 2116222

(51) Int. Cl.
*G01J 1/42* (2006.01)
*G01J 1/44* (2006.01)
*G01J 1/46* (2006.01)

(52) U.S. Cl.
CPC ....... *G01J 1/4204* (2013.01); *G01J 2001/446* (2013.01); *G01J 1/46* (2013.01)

(58) Field of Classification Search
CPC ...... G01J 1/4204; G01J 1/46; G01J 2001/446; G01J 1/44
See application file for complete search history.

(56) References Cited

U.S. PATENT DOCUMENTS 11,047,734 B1 * 6/2021 Gorsica ..................... G01J 1/46
2014/0132158 A1 5/2014 Land et al.

(Continued)

FOREIGN PATENT DOCUMENTS

EP 3370226 A1 9/2018
EP 3517906 A1 7/2019
WO 2020025760 A1 2/2020

OTHER PUBLICATIONS

International Search Report issued for the corresponding International patent application No. PCT/SG2022/050709, dated Feb. 27, 2023, 2 pages (for informationa purposes only).

(Continued)

*Primary Examiner* — Jennifer D Bennett
(74) *Attorney, Agent, or Firm* — VIERING, JENTSCHURA & PARTNER mbB

(57) ABSTRACT

The present disclosure provides an ambient light sensing system including an optical detector located beneath a display and a detector electronics. The detector electronics includes an integrator configured to integrate an output from the detector, at least one counter which is connected to the integrator, and a memory which is connected to the integrator. The at least one counter is synchronized to a synchro- (Continued)

Figure 1:
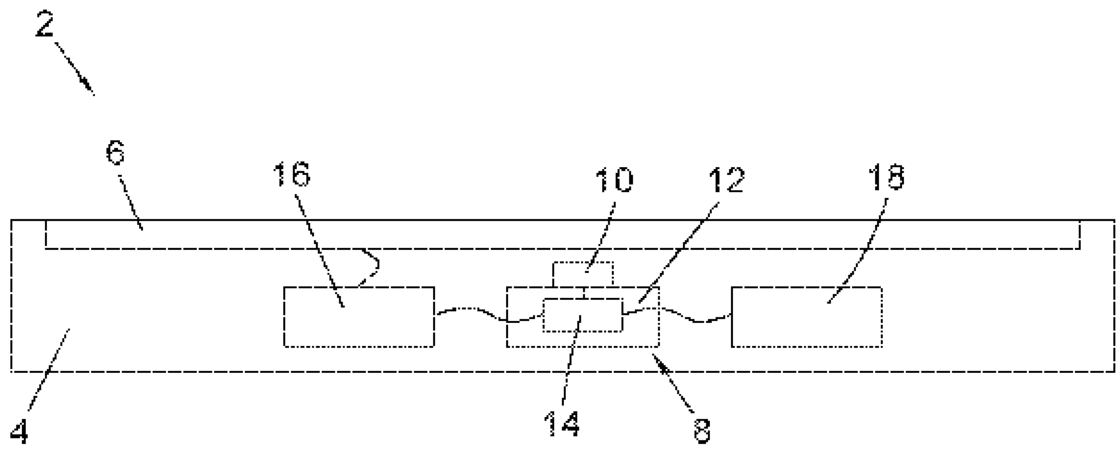

nization signal of the display. The at least one counter causes values to be periodically written from the integrator into the memory.

20 Claims, 6 Drawing Sheets

(56) References Cited

U.S. PATENT DOCUMENTS

2014/0166850 A1 6/2014 Zheng
2017/0068303 A1* 3/2017 Land .................... G01J 1/0407
2017/0344097 A1 11/2017 Land et al.
2019/0285468 A1* 9/2019 Berkovich ............. H03M 1/56
2019/0392772 A1 12/2019 Kriebernegg et al.
2020/0200603 A1 6/2020 Xu
2020/0294468 A1* 9/2020 Hung ...................... G09G 5/10
2021/0090523 A1 3/2021 Huang et al.
2021/0193079 A1 6/2021 Raynor
2021/0319753 A1 10/2021 Kelly et al.

OTHER PUBLICATIONS

Search Report issued for the corresponding British patent application No. 2116222.7, dated Mar. 3, 2022, 5 pages (for informationa purposes only).
German Search Report issued for the corresponding German patent application No. 112022005632.0, dated Mar. 31, 1 2026, 5 pages (for informational purposes only).

* cited by examiner

AMBIENT LIGHT SENSING SYSTEM AND METHOD FOR MEASURING AMBIENT LIGHT DURING PIXEL ON AND OFF PERIODS

This application is a 371 U.S. National Phase of PCT International Patent Application No. PCT/SG2022/050709, filed on Oct. 3, 2022, which claims priority from GB Patent Application No. 2116222.7, filed on Nov. 11, 2021, the disclosures of which are incorporated by reference herein in their entirety for all purposes.

TECHNICAL FIELD OF THE DISCLOSURE

The disclosure relates to an ambient light sensing system, and to a method of sending ambient light. The ambient light sensing system may form part of a smartphone, tablet or other device with a display.

BACKGROUND OF THE DISCLOSURE

The present disclosure relates to an ambient light sensing system, which may for example form part of a smartphone or tablet.

A smartphone conventionally comprises a display. The display may for example be an array of light emitting diodes (LED array), for example an array of organic light emitting didoes (OLED array). The display may be used to display content such as photographs, websites, emails, etc. to a user. An ambient light sensor is located beneath the display. The ambient light sensor measures the intensity of light incident on the display. The measured intensity of the ambient light may be used to adjust the intensity of light emitted by the display in order to optimize the viewing experience, optimize battery life, etc.

A problem associated with providing an ambient light sensor beneath a display is that light which is not ambient light is incident upon the sensor. In particular, some light emitted by the display is incident upon the ambient light sensor. This may cause the ambient light sensor to provide an inaccurate output.

It is an aim of the present disclosure to address the above problem.

SUMMARY

In general, this disclosure proposes to overcome the above problem with an ambient light sensing system which uses an integrator from which values are periodically written into a memory, the periodic writing being synchronized with respect to a synchronization signal of a display. The periodic writing may alternate between pixel off values and pixel on values.

According to a first aspect of the present disclosure, there is provided an ambient light sensing system comprising an optical detector located beneath a display and detector electronics, wherein the detector electronics comprises, an integrator configured to integrate an output from the detector, at least one counter which is connected to the integrator, and a memory which is connected to the integrator, wherein the at least one counter is synchronized to a synchronization signal of the display, and wherein the at least one counter causes values to be periodically written from the integrator into the memory.

Advantageously, this allows ambient light measurements to be obtained (including writing those measurements into a memory) in a straightforward and efficient manner.

The values periodically written from the integrator into the memory may be obtained when pixels above the optical detector are not emitting light.

Additional values may be periodically written from the integrator into the memory, the additional values being obtained at least partially when pixels above the optical detector are emitting light.

The at least one counter may cause values to be written into the memory which alternate between values obtained when pixels above the optical detector are not emitting light and values obtained at least partially when pixels above the optical detector are emitting light.

The ambient light sensing system may further comprise a delay counter configured to delay, with respect to the synchronization signal, operation of the at least one counter, the delay depending upon a position of the optical detector beneath the display.

The at least one counter may comprise a pair of counters, one counter providing an integration period corresponding with pixels above the optical detector not emitting light and the other counter providing an integration period during at least part of which pixels above the optical detector are emitting light, wherein the counters are configured to cause a value to be written from the integrator into the memory when each integration period ends.

Each counter may be configured to provide an output signal at the end of the integration period of that counter, and wherein the output signal from one of the counters is connected to the other counter and causes the integration period of the other counter to start.

The counters may be programmable.

The at least one counter may be a single counter which is programmable with an integration period corresponding with pixels above the optical detector not emitting light and programmable an integration period during at least part of which pixels above the optical detector are emitting light, wherein the counter is configured to cause a value to be written from the integrator into the memory when each integration period ends.

When one of the integration periods ends the other integration period may be programmed into the counter.

The integrator may be reset after a predetermined number of integration periods. The integrator may be reset after a predetermined period of time.

The display may be driven by a pulse width modulation signal. An integration period which provides a value to be written into the memory may be equal to a low period of the pulse width modulation signal.

The display may be driven by a pulse width modulation signal. An integration period which provides a value to be written into the memory may be shorter than a low period of the pulse width modulation signal.

The system may be configured to provide a continuous measurement. That is, the continuous measurement may alternate between values obtained when pixels above the optical detector are turned on and values obtained when pixels above the optical detector are turned off.

The optical detector may be a photodiode.

According to a second aspect of the invention, there is provided a smartphone or tablet comprising a housing, a display, a memory and a processor, and further comprising the ambient light sensing system of the first aspect of the invention.

According to a third aspect of the invention, there is provided a method of measuring ambient light using an optical detector located beneath a display, the method comprising: integrating an output from the optical detector over a first period of time, when the first period of time ends, writing an integrator output value into a memory and starting a new period of time, when the second period of time ends, writing an integrator output value into a memory and starting a new first period of time; and continuing integration of the output optical detector for additional second and first periods of time in the same manner to obtain additional output values.

Advantageously, the method allows ambient light measurements to be obtained (including writing those measurements into a memory) in a straightforward and efficient manner.

The first and second periods of time may be controlled by first and second counters.

The first and second periods of time may be controlled by a counter which is programmed to alternate between counting the first period and counting the second period.

The counter or counters may be programmed automatically by a counter which monitors a pulse width modulation signal of the display.

The counter or counters may be programmed by a processor via a serial interface.

A continuous measurement of light may be provided. The continuous measurement may alternate between values associated with pixel on and values associated with pixel off.

Features of different aspects of the disclosure may be combined together.

Embodiments of this disclosure advantageously provide improved ambient light level measurement, compared with conventional systems.

Finally, the optical sensing method and system disclosed here utilises a novel system at least in that an ambient light sensing system uses an integrator from which values are periodically written into a memory, the periodic writing being synchronized with respect to a synchronization signal of a display. The periodic writing may alternate between pixel off values and pixel on values.

BRIEF DESCRIPTION OF THE PREFERRED EMBODIMENTS

Figure 2:
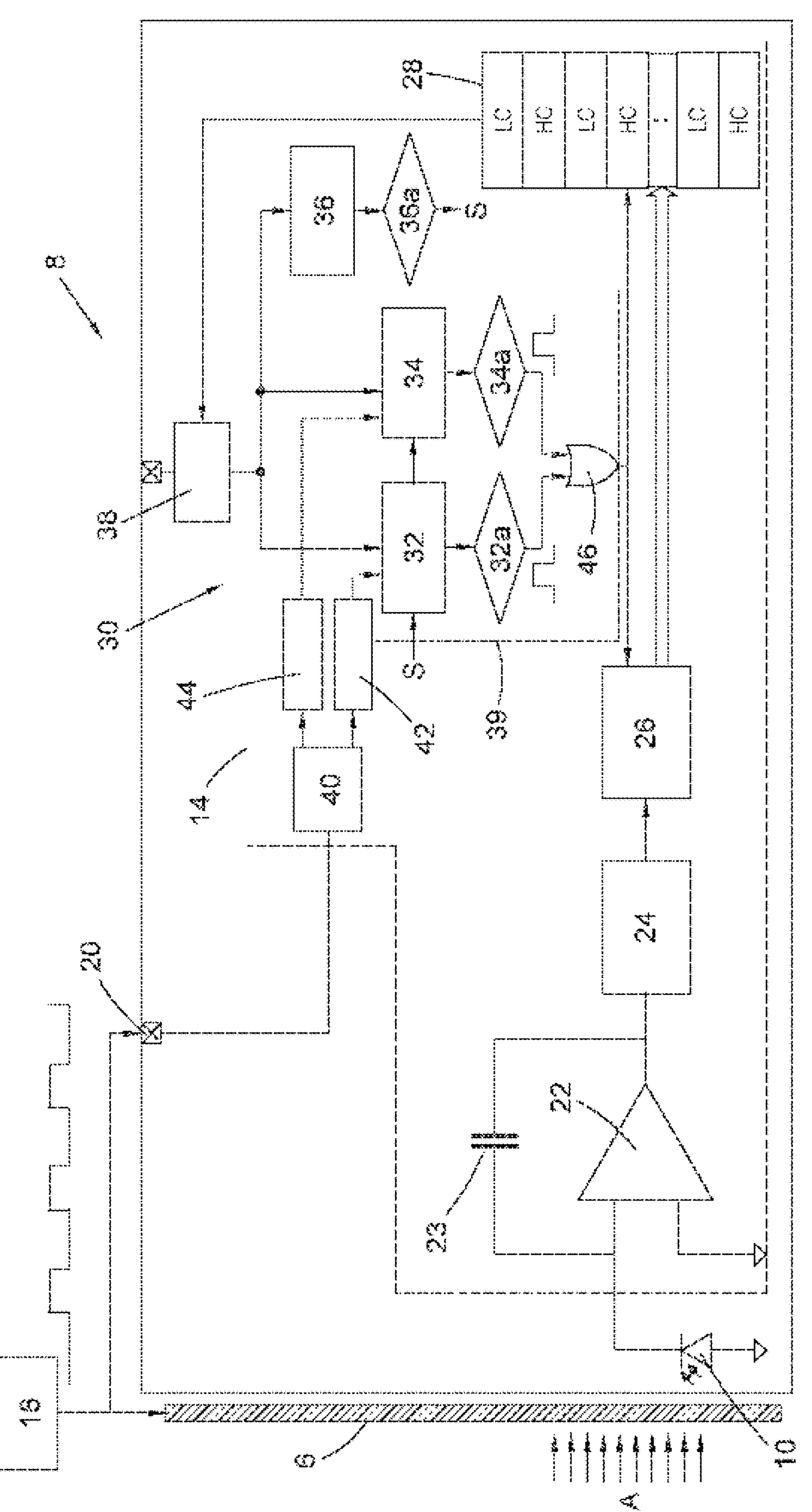
Figure 3:
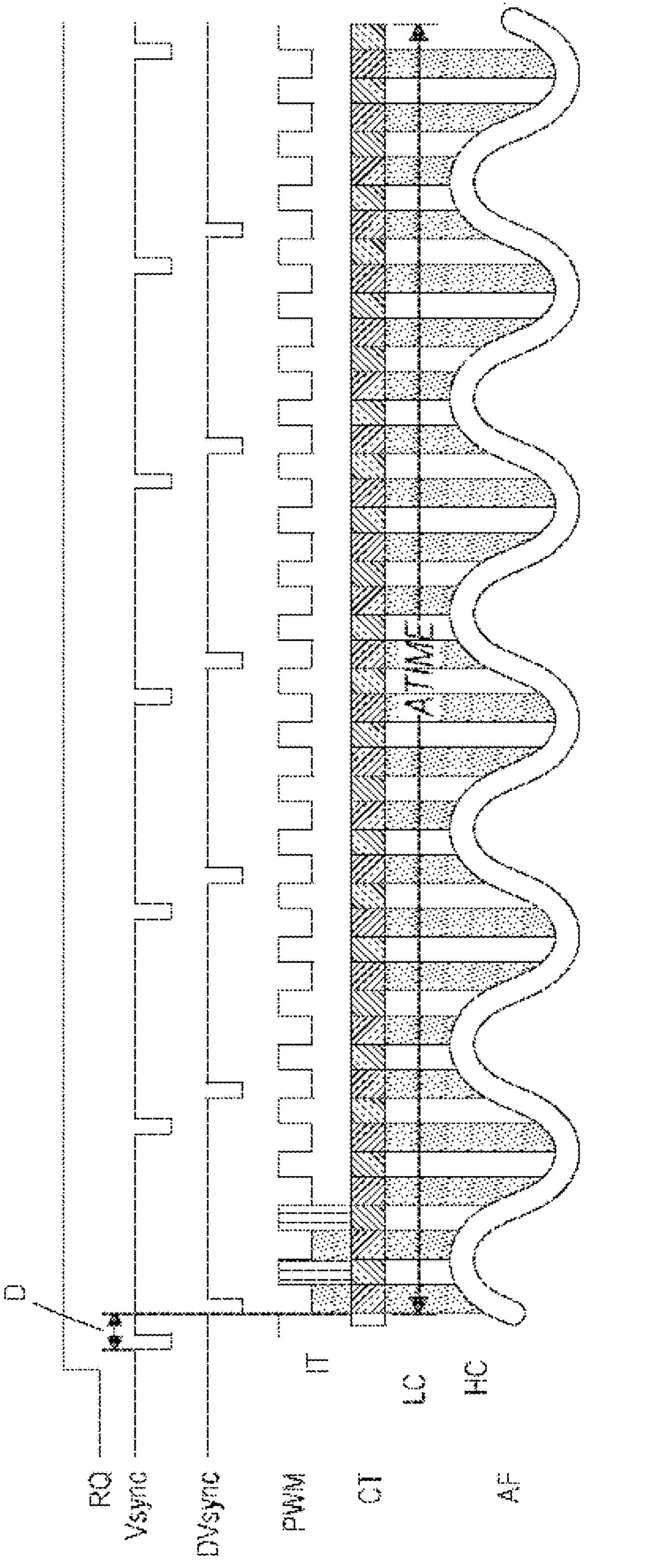
Figure 4:
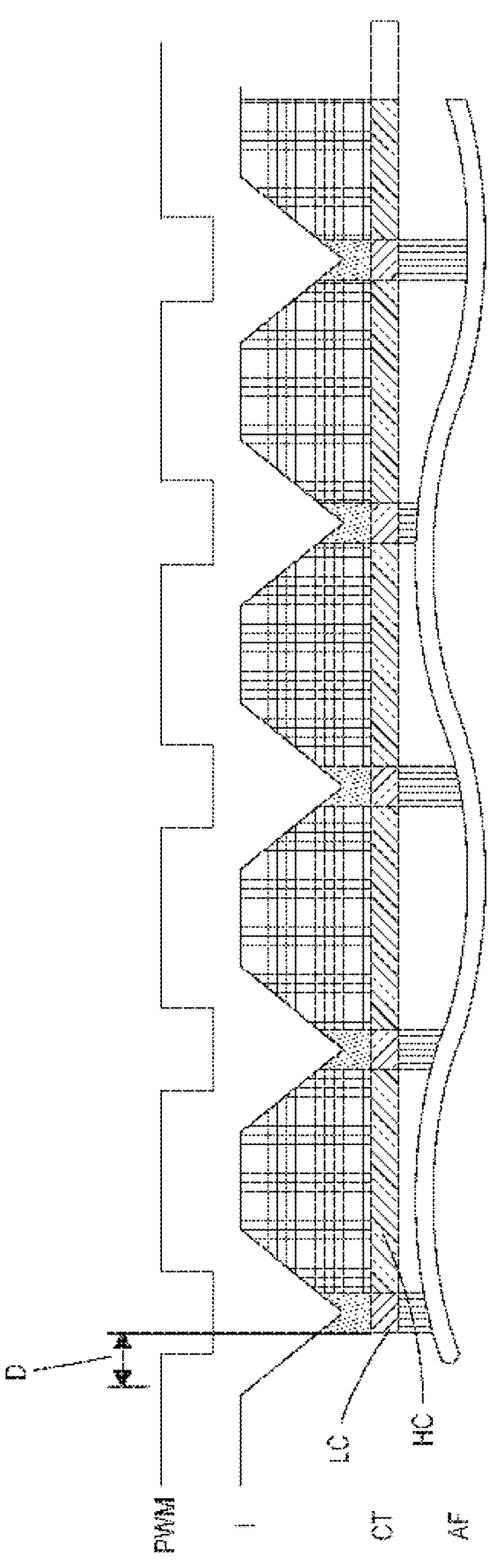
Figure 5:
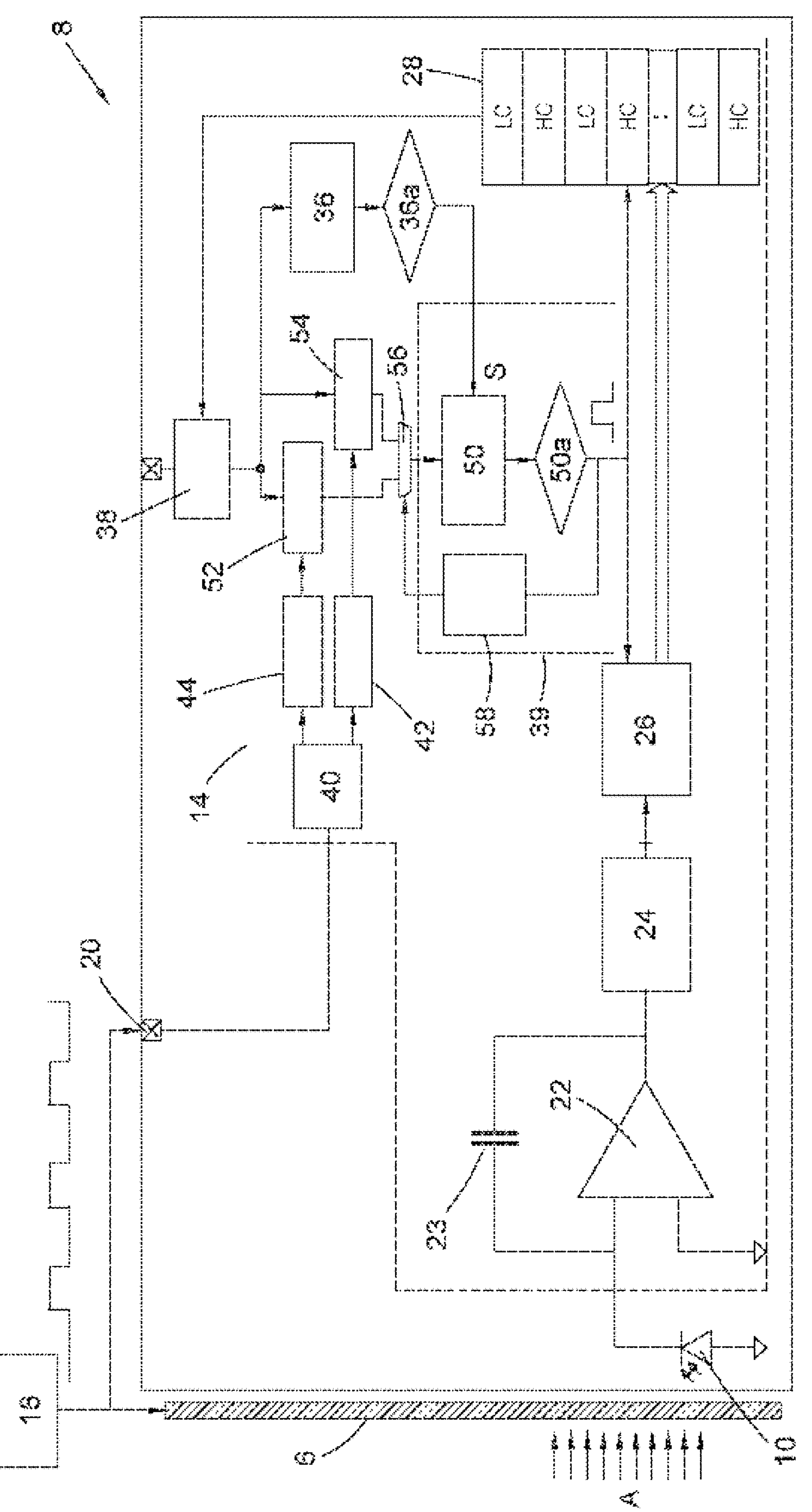
Figure 6:
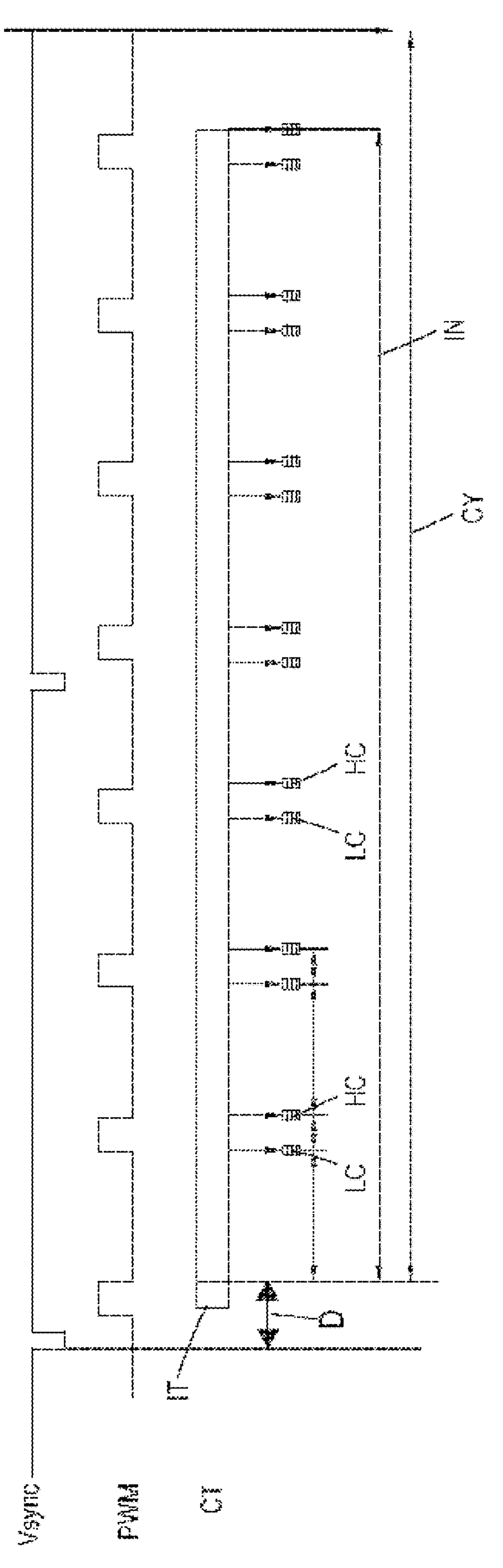

Some embodiments of the disclosure will now be described by way of example only and with reference to the accompanying drawings, in which:

FIG. 1 schematically depicts in cross-section a smartphone which includes an ambient light sensing system according to an embodiment of the disclosure;

FIG. 2 schematically depicts an ambient light sensing system according to an embodiment of the disclosure;

FIG. 3 schematically depicts operation of the ambient light sensing system of FIG. 2;

FIG. 4 schematically depicts operation of the ambient light sensing system of FIG. 2 during a different operating condition of a display screen of the smartphone;

FIG. 5 schematically depicts an ambient light sensing system according to an alternative embodiment of the disclosure; and FIG. 6 schematically depicts operation of the ambient light sensing system of FIG. 5.

DETAILED DESCRIPTION OF THE PREFERRED EMBODIMENTS

Generally speaking, the disclosure provides an ambient light sensing system which periodically writes values from an integrator into a memory. The periodic writing may alternate between pixel off values and pixel on values.

Some examples of the solution are given in the accompanying Figures.

FIG. 1 is a schematic cross-sectional depiction of a smartphone 2. The smartphone comprises a housing 4 which holds a display 6. The display 6 may for example be an LED array (e.g. an OLED array) which may be used to display images and other matter to a user. An ambient light sensing system 8 according to an embodiment of the disclosure is located beneath the display 6. Other components (not depicted) may also be provided in the smartphone. These may include a memory, a cellular modem and an RF transceiver.

The ambient light sensing system 8 comprises an optical detector 10. The optical detector 10 may for example be a photodiode (although other optical detectors may be used). The optical detector 10 may be referred to simply as a detector.

The optical detector 10 is supported by a substrate 12. The substrate 12 may for example be a printed circuit board (PCB). Detector electronics 14 are connected to the optical detector 10. The detector electronics 14 are configured to receive an output signal from the optical detector 10 and to convert that signal into data indicative of data indicative of ambient light plus light emitted by the display 6 (as described further below).

Display driver electronics 16 are also depicted in FIG. 1. The display driver electronics 16 control operation of the display 6. This includes causing periodic refreshes of the display (e.g. at a frequency of 60 Hz, at a frequency of 240 Hz or at some other frequency—typically a multiple of 60 Hz). An output from the display driver electronics 16 is connected to the detector electronics 14. The output is a signal which indicates when display refreshes are occurring. This allows the operation of the detector electronics 14 to be synchronised with the display refresh. The signal may be referred to as a display synchronisation signal (or Vsync signal).

An output from the detector electronics 14 is connected to a processor 18. The processor 18 is configured to process output signals received from the detector electronics 14, and to use those output signals to determine an ambient light characteristic (such as a level of ambient light).

Although the optical detector 10 is depicted as being beneath a central portion of the display 6, the optical detector 10 may be at some other position (e.g. some other position beneath the display). The detector electronics 14 are depicted as being located within the substrate 12 which supports the optical detector. However, they may be provided at any suitable location.

FIG. 2 schematically depicts in more detail the ambient light sensing system 8 of FIG. 1 together with the display 6. FIG. 2 schematically depicts a combination of analogue components, digital components and schematically depicts logic according to which some of the digital components operate.

As is schematically depicted, the optical detector 10 is located beneath the display 6 (which may be an OLED display). The optical detector 10 is located close to one end of the display 6. As noted above in connection with FIG. 1, the optical detector may be located at other positions beneath the display. Ambient light A is incident upon the display 6 (for ease of illustration the ambient light is depicted only for a portion of the display). A portion of the ambient light A passes through the display 6 and onto the optical detector 10. In addition, light emitted by the display 6 is also incident upon the detector 10.

The display driver electronics 16 is configured to control when the display 6 emits light and when the display does not emit light. In one example, as depicted, pulse width modulation (PWM) is used to control the brightness of the display. When PWM is used, pixels of the display are switched periodically between being on and off. This switching on and off is synchronized with respect to the Vsync signal from the display driver electronics. The Vsync signal is periodic, and may for example have a frequency of 60 Hz. The PWM signal may switch the pixels on and off multiple times per Vsync signal. In one example, the PWM may switch pixels on and off four times per Vsync signal. The switching on and off of pixels is schematically depicted by the waveform in FIG. 2 adjacent to the display drive electronics 16. The PWM signal is received at an input 20 of the ambient light sensing system 8.

An output from the optical detector 10 (which may be a photodiode) is connected to one input of an operation amplifier 22. A capacitor 23 is connected between the same input and the output of the operational amplifier 22. This arrangement converts a current output from the photodiode 10 into a voltage. An analog to digital pulse generator 24 converts the (analog) output voltage from the operational amplifier 22 into a series of digital pulses. The rate at which pulses are output from the analog to digital pulse generator 24 is directly proportional to the intensity of light incident upon the photodiode 10.

A digital pulse counter 26 counts the pulses output from the analog to digital pulse generator 24 and provides the resulting count as an output. The operational amplifier 22, capacitor 23, digital pulse generator 24 and digital pulse counter 26 may together be considered to form an integrator. Other forms of integrator may be used. The output (which may be referred to as an integrator output) is written into a memory 28. The memory 28 may be a first in first out (FIFO) which acts as a buffer that temporarily stores the output as data for subsequent transfer to the processor 18 (the data is read by the processor through a serial interface 38) The ambient light sensing system 8 is configured to determine an output count indicating light intensity when pixels in the vicinity of the photodiode 10 are switched off and to write that in the memory 28, then to determine an output count indicating the intensity of light when pixels in the vicinity of the photodiode 10 are emitting light and to write that into the memory 28. The ambient light sensing system 8 is configured to repeat this multiple times such that the memory 28 holds multiple measurements of light intensity when the pixels in the vicinity of the photodiode 10 are switched off and multiple values indicating the intensity of light when the pixels in the vicinity of the photodiode are emitting light. In this document, the count when the pixels are switched off is designated LC and the count when the pixels are switched on is designated HC. The counts transferred to the memory 28 are schematically depicted by the table in FIG. 1.

A switching system 30 of the ambient light sensing system 8 comprises a first programmable counter 32 and a second programmable counter 34. The first programmable counter 32 is configured to count during a period when the pixels in the vicinity of the photodiode 10 are not emitting light. This counter may therefore be referred to as a pixel off counter 32. The second counter 34 is configured to count when pixels in the vicinity of the photodiode 10 are emitting light. This counter may be referred to as a pixel on counter 34. A third programmable counter 36 is also provided. This counter is configured to apply an initial delay before operation of the pixel off counter 32. The third counter 36 may be referred to as an initial delay counter 36. The counters 32, 34, 36 are each configured to provide an output pulse when their programmed count is completed. The initial delay counter 36 is programmed with a count via a serial interface 38 (e.g. controlled by the processor 18—see FIG. 1). The period of the count programmed into the initial delay counter depends upon the position of the ambient light sensor 10 beneath the display 6 (as is explained further below). The periods of the counts programmed into the pixel on and off counters 32, 34 may be automatically determined by a counter 40, as explained below. Alternatively, the counts programmed into the pixel on and off counters 32, 34 may be provided by the processor 18 via the serial interface 38.

The PWM signal output from the display driver electronics 16 is connected via the input 20 to a pulse width modulation counter 40. A first output 42 from the PWM counter 40 is a count which corresponds with the pixel off period of the PWM signal. This output is provided to the pixel off counter 32. A second output 44 from the PWM counter 40 corresponds with a pixel on period of the PWM signal. This output 44 is provided to the pixel on counter 34. This arrangement advantageously ensures that the pixel off period used by the pixel off counter 32 will automatically change if the pixel off period of the PWM signal output from the display driver electronics 16 changes, and that the pixel on period used by the pixel on counter will automatically change if the pixel on period of the PWM signal changes. The pixel on counter 32 and pixel off counter 34 may be interchangeable. One of the counters 32, 34 will count the pixel on period and the other will count the pixel off period.

When one of the counters 32, 34, 36 reaches the end of its counting period, it provides an output signal. This is generation of output signals is schematically indicated by diamonds 32*a*, 34*a*, 36*a*. Outputs 32*a*, 34*a* from the pixel off counter 32 and the pixel on counter 34 are both connected to an OR logic gate 46. The output from the OR logic gate 46 is connected to the digital pulse counter 26 and the memory 28. When the output from the OR gate 46 goes high, the count of the digital pulse counter 26 is written into the memory 28. The output 36*a* from the initial delay counter 36 starts operation of the pixel off counter 32, as indicated by the letter S.

An input from the display driver electronics 16, or from other electronics of the device 2, provides a Vsync signal to the initial delay counter 36. This input is not depicted in FIG. 2 to avoid over-complicating the figure.

FIG. 3 schematically depicts operation of the embodiment depicted in FIG. 2. Various waveforms which form part of operation of the embodiment, or are useful for explaining the embodiment, are depicted.

A period ATIME is indicated in FIG. 3. This is the period over which an ambient light measurement is performed. The period ATIME may for example be determined by the processor 18, being the time needed in order to obtain an ambient light measurement of a desired accuracy. The period ATIME may be limited by the size of the memory 28.

At the top of FIG. 3 is a signal RQ which indicates a request from the processor 18 for an ambient light measurement. When the signal RQ goes high, then the ambient light measurement will take place when the next Vsync pulse occurs. For ease of illustration RQ is not included in FIGS. 4 and 6.

A Vsync signal is depicted in FIG. 3. As noted further above this is a signal which controls refresh of the display 6. In a conventional smartphone, or other device, the Vsync has a frequency of 60 Hz. The Vsync frequency is typically 60 Hz or a multiple of 60 Hz (e.g. 120 Hz or 240 Hz), although it can have some other value. The Vsync signal is a digital pulse which has a duration that is typically between 150 μs and 200 λs (although it may be longer or shorter than this).

The next line DVsync in FIG. 3 depicts the time at which the display refresh passes over the photodiode 10 (see FIG. 2). The refresh of the display which is triggered by the Vsync signal does not take place simultaneously across the entire display 6, but instead the refresh is a band of non-emitting pixels which moves across the display (typically in a vertical direction). It is desirable for the photodiode 10 to detect light when the band of non-emitting pixels passes over the photodiode 10. A delay D, depicted by a double headed arrow, between the Vsync signal and the time when the non-emitting pixels pass over the photodiode 10 may be determined via a calibration measurement. This delay D as determined by the calibration may be used to program the initial delay counter 36. Smartphones, or other devices, of a particular design will have the photodiode 10 in the same position, and thus the calibration measurement does not need to be performed for each device but only for the particular model of device. The delay D delays the Vsync signal by a period which corresponds with the time until the display refresh passes over the photodiode 10 (i.e. delays Vsync so that it corresponds with DVsync). Thus, the duration of the delay D is selected to ensure that pixels above the photodiode 10 are switched off when the LC (pixel off) measurements are performed.

The next signal shown in FIG. 3 is the pulse width modulation PWM signal as applied to pixels located over the photodiode 10. The PWM signal goes low (i.e. no pixel emission) at a time which corresponds with the start of the Vsync pulse as received at those pixels (i.e. the Vsync pulse delayed by the delay D, that is signal DVsync). The PWM signal then switches between high (pixel emission) and low (no pixel emission) with a duty cycle determined by the brightness at which it is desired to operate the display. The frequency of the PWM signal may be a multiple of the Vsync frequency as depicted. In the example depicted in FIG. 3 the PWM signal is four times the frequency of the Vsync signal (e.g. 240 Hz when the Vsync is 60 Hz). Other multiples of the Vsync frequency may be used.

Referring to FIGS. 2 and 3 in combination, when operation of the ambient light sensing system 8 commences, the initial delay counter 36 starts counting at the beginning of a Vsync pulse. At the same time the operational amplifier 22 and capacitor 23 are initialising (a desired voltage is applied to them), so that they are ready to commence operation. The initialisation time is shorter than the delay D and is labelled IT in FIG. 3.

Once the delay counter 36 has reached the delay period D that was programmed into it, it provides an output signal which triggers operation of the pixel off counter 32. The off period of the PWM signal has been programmed into the pixel off counter 32 and the on period of the PWM signal has been programmed into the pixel on counter 34, as explained above. The operation of the counters 32, 34 is depicted by the signal CT in FIG. 3. The start of the signal CT is the initialisation time IT mentioned above. After initialisation, when triggered by the delay counter 36 output, the pixel off counter 32 begins counting. The pixel off counter 32 runs until it reaches its programmed duration and then provides an output pulse. The output pulse passes to the OR gate 46. During this period the digital pulse counter 26 (which may be referred to as an integrator) is counting a value indicative of the intensity of light incident upon the photodiode 10 when pixels above the photodiode are turned off. When the OR gate 46 is triggered by the pixel on the counter 32 the count value in the digital pulse counter 26 is transferred to the memory 28. This is a pixel off count 32 and is identified as such in the memory (e.g. by an output from a sequencer as explained further below). This measurement of intensity during the pixel off period is depicted in FIG. 3 by the first shaded box LC of the signal CT.

In addition to providing an output pulse to the OR gate 46 the pixel off counter 32 also provides an output pulse to the pixel on counter 34. This causes the pixel on counter 34 to start counting. The pixel on counter 34 will continue counting until it reaches its programmed time period and will then generate an output pulse which passes to the OR gate 46. Again, the digital pulse counter 26 has been receiving an input which corresponds with the intensity of light on the photodiode 10. Again, the output pulse from the OR gate 46 causes the count value, which corresponds with the intensity of light when the pixels above the photodiode 10 are on, to be transferred to the memory 28. This measurement of intensity during the pixel on period is depicted in FIG. 3 by the first unshaded box HC of the signal CT. The pixel on counter output also triggers the pixel off counter 32 to once again count. Measurement of intensity during each pixel off period and each pixel on period continues, as schematically depicted. Each pixel off measurement is shown as a shaded box LC and each pixel on measurement is shown as an unshaded box HC.

The measurements continue until ATIME has ended. At this time a sequencer 39 stops the measurements. At this time the digital pulse counter 26 may be reset. The sequencer may perform other functions. For example, the sequencer may provide a value indicating whether an output is a pixel on measurement or a pixel off measurement. This value may be stored in the memory 28 together with the measurement value. The sequencer 39 is schematically depicted by a dashed line which encloses the components controlled by the sequencer.

If the PWM signal controlling the display changes (e.g. duty cycle change or PWM frequency change), then the sequencer 39 may determine this (e.g. via comparison of outputs from the pixel on and off counters 32, 34). The sequencer 39 may output a value indicating that the PWM signal has changed. As explained further above, the counts in the counters 32, 34 will automatically be adjusted by the pulse width modulation counter 40. However, a measurement obtained whilst the change was taking place will not be accurate. This measurement is identified by the sequencer 39, and a value indicating the inaccurate measurement is stored in the memory 28. The inaccurate measurement may be discarded by the processor 18 during analysis of the measurements.

The values LC, HC stored in the memory 28 are used by the processor 18 of the device 2 (see FIG. 1) to determine the level of ambient light. This may be achieved with good accuracy because the photodiode 10 measures incident light for the entire duration of each pixel off period, thereby providing a strong signal to noise ratio for the pixel off measurements. Embodiments of the invention advantageously allow control of the period during which pixel off measurements are performed, as is explained further below. Ambient light, including ambient light flicker, is schematically depicted by curve AF in FIG. 3. As may be seen from FIG. 3, several pixel off measurements LC are performed per cycle of the ambient light flicker AF. As a result, the measurements provide enough information to characterise the ambient light flicker AF. In this example the ambient light has a frequency which corresponds with the Vsync frequency (60 Hz), but in other examples may have a different frequency.

The embodiment of FIG. 3 provides a continuous measurement. The continuous measurement alternates between pixel off and pixel on. Thus, the output of the continuous measurement is an alternating series of values (alternating between LC and HC in FIG. 3).

FIG. 4 schematically depicts the embodiment of FIG. 2 operating under different PWM conditions. In this case the PWM signal is higher for a longer period than it is low. The relatively short duration of the PWM signal is such that, even when pixels above the photodiode 10 are not emitting light, pixels either side of the photodiode are emitting some light which is detected by the photodiode. As a result, the intensity of light incident upon the photodiode 10 from the display never drops to zero. This is schematically depicted in FIG. 4. The upper signal is the PWM signal as applied to pixels located over the photodiode 10. The middle signal I is the intensity of light incident upon the photodiode 10. As is depicted, the intensity of light I incident on the photodiode 10 periodically drops to a minimum at the centre of the off period of the PWM signal. However, it does not go to zero. Through a combination of the selection of the initial delay D and selection of the duration of the period of the pixel off counter 32 and the period of the pixel on counter 34, measurement of the intensity of light of the photodiode 10 may be centred around the minimum of light intensity incident upon the photodiode 10. In addition the duration of the pixel off period 32 can be selected.

The operation of the pixel off and pixel on counters 32, 34 is depicted by the signal CT. Measurements of intensity during the pixel off periods are depicted by shaded boxes LC of the signal CT. Measurements of intensity during the pixel on periods are depicted by unshaded boxes HC of the signal CT.

As may be seen in FIG. 4, the period of the pixel off counter 32 is shorter than the pixel off period of the PWM signal. As a result, relatively high intensity light from the display which would otherwise have been included in the pixel off measurements LC is excluded from this measurement. The duration of each pixel off measurement LC could be made even shorter, so that even less light from the display is measured. However, if the pixel off measurement LC is made too short then the signal to noise ratio that it provides may be low such that the resulting measurement lack accuracy. The period of the pixel off measurements LC may be selected to provide a sufficiently good signal to noise ratio whilst at the same time avoiding including too much display light in the measurements. The period of the pixel off measurements may for example be as little as 40 μS, although a longer pixel off measurement may be preferable (the longer the measurement the greater the accuracy).

Ambient light flicker AF is also depicted in FIG. 4. In this example, the frequency of the PWM signal is not a multiple of the ambient light flicker AF. As a result, intensity measurements performed during the pixel off measurements LC sample different intensities of ambient light. As can be seen, sufficient information is obtained from the pixel off measurements LC to allow the ambient light flicker, and the ambient light more generally, to be determined.

Intensity measurements are also performed during the (extended) pixel on periods, as is schematically depicted in FIG. 4. Typically the pixel on measurements HC are not used. However, the pixel on measurements HC may be used in some cases, e.g. if the processor 18 is running software that takes account pixel on measurements.

As with the embodiment of FIG. 3, the embodiment of FIG. 4 may also provide a continuous measurement. Again, the continuous measurement alternates between pixel off and pixel on. Thus, the output of the continuous measurement is an alternating series of values (alternating between LC and HC in FIG. 4).

When the operational mode depicted in FIG. 3 is used, the pixel on measurements HC correspond with the high PWM signal and the pixel off measurements correspond with the low PWM signal. The measurement durations are controlled by the pixel on and off counters 32, 34 which are automatically programmed by the pulse width modulation counter 40. Since the measurement periods are automatically linked to the PWM signal, they do not deviate from the PWM signal. The operational mode depicted in FIG. 4 requires that the pixel off measurement duration be shorter than the low PWM signal duration. In order to achieve this, instead of the pixel on and off counters 32, 34 being programmed by the pulse width modulation counter 40, they are programmed by the processor 18 via the serial interface 38. The processor 18 monitors the PWM signal and then programs a predetermined pixel off measurement period and predetermined measurement on period into the counters 30, 32. If a change of the PWM signal occurs, the processor 18 programs the counters 30, 32 accordingly and then re-starts the measurement. As explained further above, the processor 18 also programs the delay counter 36. The delay counter value D may be used to ensure that the pixel off measurement LC is centred around a minimum of the intensity of pixel light on the detector 10 (e.g. as depicted in FIG. 4).

FIG. 5 schematically depicts an ambient light sensing system 8 according to an alternative embodiment of the invention. The embodiment is similar to the embodiment of FIG. 2 but includes some differences. Due to the similarity between the embodiments, the parts of FIG. 5 which correspond with FIG. 2 are not described again.

In the embodiment depicted in FIG. 5 a single counter 50 is provided instead of the pixel off counter 32 and pixel on counter 34 of the preceding embodiment. In addition, two programmable registers 52, 54 are provided. The first programmable register 52 is connected to the pixel off period output 44 of the PWM counter 40. This programmable register may be referred to as the pixel off register 52. The second programmable register 54 is connected to the pixel on period output 42 of the PWM counter 40. This programmable register may be referred to as the pixel on register 54. Outputs from the pixel off register 52 and pixel on register 54 pass via a multiplexer 56 to the programmable counter 50. An output from the delay counter 36 also passes to the programmable counter 50. The multiplexer 56 is controlled by a selector 58 which is connected to the output 50*a* of the programmable counter 50. The multiplexer 56 controls loading values from the pixel off register 52 and pixel on register 54 into the programmable counter 50. The multiplexer 56 and selector 58 form part of a sequencer 39.

Operation of the embodiment of FIG. 5 is schematically depicted in FIG. 6. Referring to FIGS. 5 and 6 in combination, a Vsync signal is shown, and beneath this a representation of a PWM signal as applied to pixels located over the photodiode 10. For the reasons explained above in connection with FIG. 4, the intensity of light incident upon the photodiode 10 may not correspond exactly with the PWM signal. However, in this embodiment, for ease of explanation, it is assumed that the intensity of light incident upon the photodiode 10 corresponds with the PWM signal. A delay D between the leading edge of the Vsync pulse and the first subsequent high to low transition (pixel on to pixel off) of the PWM signal is stored in the delay counter 36. As with previous embodiments, this delay may be determined using a calibration measurement performed on a representative device (e.g. smart phone) which has the same configuration as the device in which the ambient light sensing system 8 is provided.

Below the PWM signal the count CT as determined by the combined counter digital pulse counter 26 is indicated along with outputs to the memory 28. The outputs to the memory are indicated by arrows 56 and stacks of rectangles (which schematically depict registers of the memory). The outputs comprise values LC output at the end of a pixel off period and values HC output at the end of a pixel on period. The digital pulse counter 26 continues to increment (i.e. is not set to zero) when a value is read into the memory 28. After a predetermined time, which may be referred to as an integration time IN the digital pulse counter 26 is reset.

In use, a cycle of the ambient light sensing system 8 is as set out below. At the down transition of the Vsync pulse the delay counter 36 begins counting. The digital pulse counter 26 is initialised. As depicted, initialization IT of the digital pulse counter 24 takes less time than the delay D. When the delay period D has ended, an output pulse from the delay counter 36 triggers the combined counter 50 and also starts operation of the digital pulse counter 26. This corresponds with the start of the pixel off period of the pixels above the photodiode 10 (as schematically depicted in FIG. 6). The period for which the combined counter 50 counts is determined by the off period register 52 (the off period value having previously been loaded into the off period register 52 from the pixel off period output 44 of the PWM counter 40). At the end of that period the combined counter generates an output signal which causes an output from the digital pulse counter 26 to be transferred into the memory 28. The digital pulse counter 26 is not reset but instead continues to count. The output signal 50*a* from the combined counter 50 causes the selector 58 to operate the multiplexer 56 such that the value stored in the on period register 54 is loaded into the combined counter 50.

At the end of the pixel on period the combined counter 50 generates an output pulse which causes the value held in the digital pulse counter 26 to be transferred to the memory 28. The selector 58 causes the pixel off period to once again be written into the combined counter 50 via the switch 56. Again, the combined counter 50 counts for the pixel off period, at the end of which another value is transferred from digital pulse counter 26 to the memory 28.

Because the digital pulse counter 26 is not reset, each value output from the digital pulse counter 26 is greater than the previous value. This continues for a predetermined time, which may be referred to as the integration time IN. In this instance, the integration time IN is slightly less than twice the Vsync period. The integration time IN in this embodiment is one PWM cycle less than a cycle time CY. The cycle time CY is a multiple of (or corresponds with) the period of the Vsync signal. Because the cycle time CY is a multiple of (or corresponds with) the period of the Vsync signal, operation of the embodiment can stay in synchronisation with the display refresh. Providing an integration time IN which is less than the cycle time CY allows initialisation of the combined counter CT to take place during the delay period D, thereby allowing the counter CT to stay in synchronisation with the display refresh.

The values in the memory increment upwards by amounts determined by the intensity of light during pixel on and pixel off. The processor 18 (see FIG. 1) can convert the values via subtraction into intensity values for pixel on and pixel off periods during a processing step. The same approach may be used for other embodiments. In some embodiments, the counter may be reset each time a value is read out from the counter. In such embodiments, values stored in the memory are indicative of the light intensity during pixel on or pixel off.

As with previously described embodiments of the invention, the pixel off register 52 and pixel on register 54 may be automatically programmed by the PWM counter 40. Alternatively, they may be programmed by the processor 18 via the serial interface 38. Programming by the processor 18 allows the pixel on and off periods to deviate from the PWM periods. A selector may be used to govern operation of the counters.

As with other embodiments, the embodiment of FIG. 5 may also provide a continuous measurement. Again, the continuous measurement alternates between pixel off and pixel on. Thus, the output of the continuous measurement is an alternating series of values (alternating between LC and HC in FIG. 5). In general, embodiments of the invention may provide a continuous measurement. The continuous measurement may alternate between values associated with pixel on and values associated with pixel off.

In embodiments of the invention, the duration of the pixel off measurement can be programmed according to the equation:

$$\text{Pixel Off Count } (LC) = PWM \text{ period} - \text{Pixel On Count } (HC).$$

The timing of the pixel off measurement may be programmed using the delay D.

Because the timing of the pixel off measurement LC can be accurately controlled, this avoids the pixel off measurement drifting off over time. This advantageously avoids errors which would otherwise occur in the measured values. Because the duration of the pixel off measurement LC can be accurately controlled, this allows the signal to noise ratio of the pixel off measurement to be selected, whilst at the same time avoiding light emitted from adjacent display pixels from overwhelming the pixel off measurement. As noted further above, the pixel off measurement period may for example be set to be the same as the PWM off period, or may for example be shorter than the PWM off period.

Although the ambient light sensing system has been described in a smartphone, in other embodiments the proximity sensing system may be in a tablet computer or other device with a display (e.g. a device in which an optical sensing system is provided behind a display).

The above description refers to counters. These may be considered to be examples of timers.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

It will be appreciated that aspects of the present invention can be implemented in any convenient way including by way of suitable hardware and/or software. For example, a device arranged to implement the invention may be created using appropriate hardware components. Alternatively, a programmable device may be programmed to implement embodiments of the disclosure. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein.

LIST OF REFERENCE NUMERALS

2—Smartphone
4—Housing
6—Display
8—Ambient light sensing system
10—Optical detector
12—Substrate
14—Detector electronics
16—Display driver electronics
18—Processor
20—Input
22—Operational amplifier
23—Capacitor
24—Digital pulse generator
26—Digital pulse counter
28—Memory
30—Switching system
32—First programmable counter (pixel off counter)
34—Second programmable counter (pixel on counter)
36—Third programmable counter (delay counter)
38—Serial interface
39—Sequencer
40—Pulse width modulation counter
42—First output from PWM counter
44—Second output from PWM counter
46—OR logic gate
50—Single counter
52—First programmable register
54—Second programmable register
56—Multiplexer

The invention claimed is:

1. An ambient light sensing system comprising an optical detector located beneath a display and detector electronics, wherein the detector electronics comprises:

an integrator configured to integrate an output from the optical detector;

at least one counter which is connected to the integrator; and a memory which is connected to the integrator;

wherein the at least one counter is synchronized to a synchronization signal of the display, and wherein the at least one counter causes values to be periodically written from the integrator into the memory, wherein the values periodically written from the integrator into the memory are obtained when pixels above the optical detector are not emitting light, wherein additional values are periodically written from the integrator into the memory, the additional values being obtained at least partially when pixels above the optical detector are emitting light, wherein the at least one counter causes values to be written into the memory which alternate between values obtained when pixels above the optical detector are not emitting light and values obtained at least partially when pixels above the detector are emitting light, and wherein the at least one counter comprises one of:

a pair of counters, one counter providing an integration period corresponding with pixels above the detector not emitting light and the other counter providing an integration period during at least part of which pixels above the detector are emitting light, wherein the counters are configured to cause a value to be written from the integrator into the memory when each integration period ends, or a single counter which is programmable with an integration period corresponding with pixels above the optical detector not emitting light and programmable with another integration period during at least part of which pixels above the optical detector are emitting light, wherein the counter is configured to cause a value to be written from the integrator into the memory when each integration period ends.

2. The ambient light sensing system of claim 1, further comprising a delay counter configured to delay, with respect to the synchronization signal, operation of the at least one counter, the delay depending upon a position of the optical detector beneath the display.

3. The ambient light sensing system of claim 1, wherein the at least one counter comprises a pair of counters, one counter providing an integration period corresponding with pixels above the detector not emitting light and the other counter providing an integration period during at least part of which pixels above the detector are emitting light, wherein the counters are configured to cause a value to be written from the integrator into the memory when each integration period ends.

4. The ambient light sensing system of claim 3, wherein each counter is configured to provide an output signal at the end of the integration period of that counter, and wherein the output signal from one of the counters is connected to the other counter and causes the integration period of the other counter to start.

5. The ambient light sensing system of claim 3, wherein the counters are programmable.

6. The ambient light sensing system of claim 1, wherein the at least one counter is a single counter which is programmable with an integration period corresponding with pixels above the optical detector not emitting light and programmable with an integration period during at least part of which pixels above the optical detector are emitting light, wherein the counter is configured to cause a value to be written from the integrator into the memory when each integration period ends.

7. The ambient light sensing system of claim 5, wherein when one of the integration periods ends the other integration period is programmed into the counter.

8. The ambient light sensing system of claim 7, wherein the integrator is reset after a predetermined number of integration periods.

9. The ambient light sensing system of claim 1, wherein the display is driven by a pulse width modulation signal, and wherein an integration period which provides a value to be written into the memory is equal to a low period of the pulse width modulation signal.

10. The ambient light sensing system of claim 1, wherein the display is driven by a pulse width modulation signal, and wherein an integration period which provides a value to be written into the memory is shorter than a low period of the pulse width modulation signal.

11. The ambient light sensing system of claim 1, wherein the system is configured to provide a continuous measurement.

12. The ambient light sensing system of claim 1, wherein the optical detector is a photodiode.

13. A smartphone or tablet comprising a housing and a processor, and further comprising the ambient light sensing system of claim 1.

14. A method of measuring ambient light using an optical detector located beneath a display, the method comprising:

integrating an output from the detector over a first period of time;

when the first period of time ends, writing an integrator output value into a memory and starting a second period of time;

when the second period of time ends, writing an integrator output value into the memory and starting a new first period of time; and continuing integration of the output detector for additional second and first periods of time in the same alternating manner to obtain and provide additional output values into the memory, wherein the first periods of time correspond to when pixels above the optical detector are not emitting light, wherein the second periods of time correspond to when pixels above the optical detector are emitting light, and wherein the first and second periods of time are configured to be controlled by one of:

first and second counters counting the first and second periods of time respectively, or a counter which is programmed to alternate between counting the first and second periods of time.

15. The method of claim 14, wherein the first and second periods of time are controlled by first and second counters.

16. The method of claim 14, wherein the first and second periods of time are controlled by a counter which is programmed to alternate between counting the first period and counting the second period.

17. The method of claim 15, wherein the first and second counters are programmed automatically by a pulse width modulation counter which monitors a pulse width modulation signal of the display.

18. The method of claim 15, wherein the first and second counters are programmed by a processor via a serial interface.

19. The method of claim 15, wherein a continuous measurement of light is provided.

20. An ambient light sensing system comprising an optical detector located beneath a display and detector electronics, wherein the detector electronics comprises:

an integrator configured to integrate an output from the optical detector;

at least one counter which is connected to the integrator; and a memory which is connected to the integrator;

wherein the at least one counter is synchronized to a synchronization signal of the display, and wherein the at least one counter causes values to be periodically written from the integrator into the memory, wherein the values periodically written from the integrator into the memory are obtained when pixels above the optical detector are not emitting light, wherein additional values are periodically written from the integrator into the memory, the additional values being obtained at least partially when pixels above the optical detector are emitting light, wherein the at least one counter causes values to be written into the memory which alternate between values obtained when pixels above the optical detector are not emitting light and values obtained at least partially when pixels above the detector are emitting light, and further comprising a delay counter configured to delay, with respect to the synchronization signal, operation of the at least one counter, the delay depending upon a position of the optical detector beneath the display.

* * * * *